United States Patent [19]

Jung et al.

[11] Patent Number: 5,954,800
[45] Date of Patent: Sep. 21, 1999

[54] DATA COMMUNICATIONS NETWORK ADAPTOR WITH DUPLICATE INTERFACE BOARDS OPERATING ALTERNATELY IN ACTIVE AND STAND-BY MODES

[75] Inventors: Byung-Ho Jung; Jong-Tae Hwangbo, both of Incheon, Rep. of Korea

[73] Assignee: Daewoo Telecom Ltd., Incheon, Rep. of Korea

[21] Appl. No.: 08/879,051

[22] Filed: Jun. 19, 1997

[30] Foreign Application Priority Data

Jun. 20, 1996 [KR] Rep. of Korea ............... 96-22511

[51] Int. Cl.⁶ ............................................. G06F 13/00
[52] U.S. Cl. ................................. 709/250; 714/13
[58] Field of Search ...................... 395/200.8, 182.03, 395/182.07, 182.08, 182.09, 182.11

[56] References Cited

U.S. PATENT DOCUMENTS

| | | | |
|---|---|---|---|
| 5,088,021 | 2/1992 | McLaughlin et al. | 364/187 |
| 5,136,498 | 8/1992 | McLaughlin et al. | 364/184 |
| 5,148,433 | 9/1992 | Johnson et al. | 371/11.3 |
| 5,251,299 | 10/1993 | Masuda et al. | 395/200 |
| 5,434,998 | 7/1995 | Akai et al. | 395/575 |
| 5,568,471 | 10/1996 | Hershey et al. | 370/17 |
| 5,621,885 | 4/1997 | Del Vigna, Jr. | 395/182.11 |
| 5,627,962 | 5/1997 | Goodrum et al. | 395/182.11 |
| 5,777,874 | 7/1998 | Flood et al. | 364/187 |
| 5,784,551 | 7/1998 | De Leva et al. | 395/182.11 |
| 5,802,265 | 9/1998 | Bressoud et al. | 395/182.09 |
| 5,812,751 | 9/1998 | Ekrot et al. | 395/182.02 |

*Primary Examiner*—Lance Leonard Barry
*Attorney, Agent, or Firm*—Pennie & Edmonds LLP

[57] ABSTRACT

An apparatus for interfacing a data processing system with a plurality of data communications networks comprises: M number of interfacing units, each for coordinating data exchange between the data processing system and the plurality of data communications networks, wherein each of the M number of interfacing units are identical to each other and operate alternately in an active and a stand-by modes so that one in the M number of interfacing units is in active mode while the others are in stand-by mode and M is a positive integer larger than one; and buses for exchanging data among the M number of interfacing units.

16 Claims, 5 Drawing Sheets

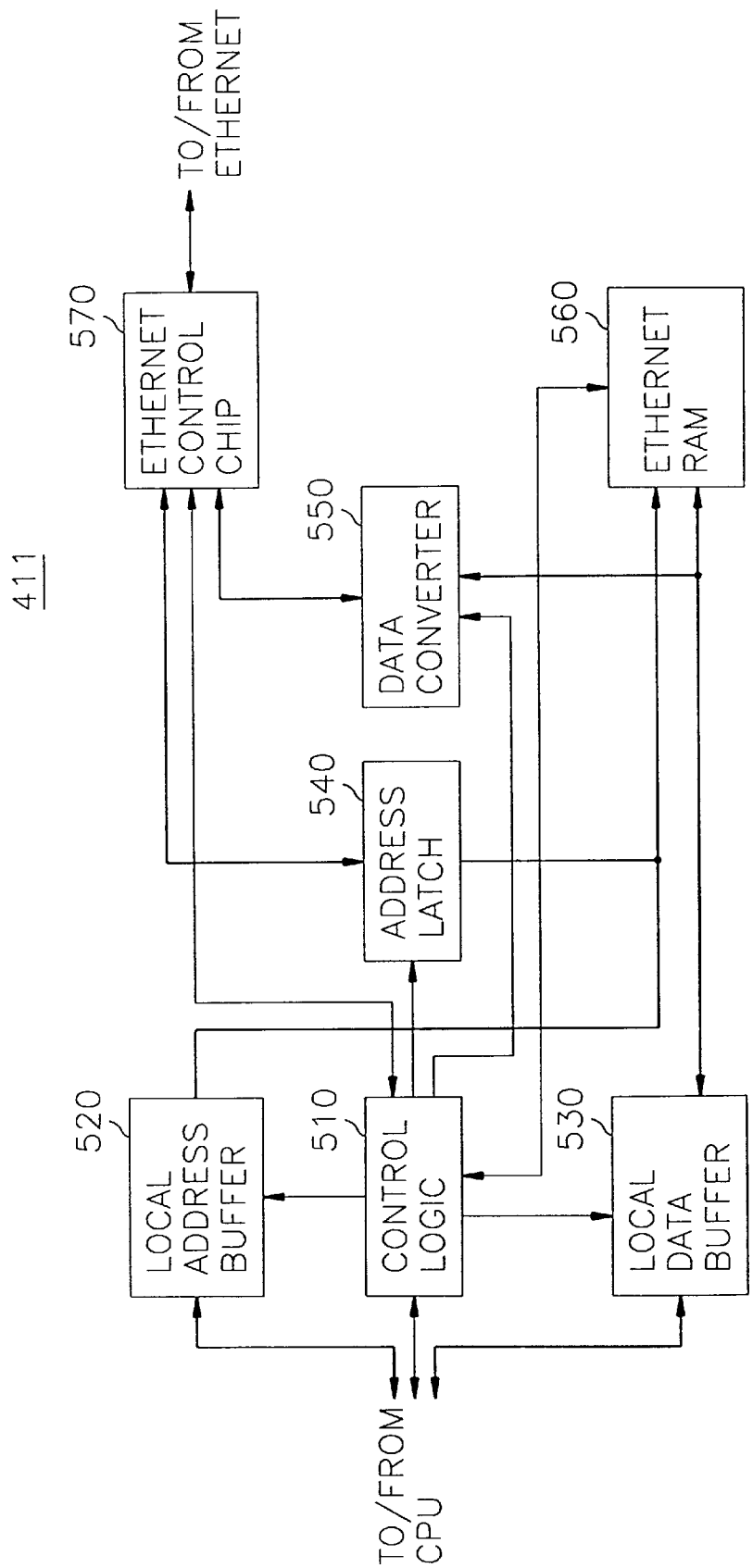

DATA COMMUNICATIONS NETWORK ADAPTOR WITH DUPLICATE INTERFACE BOARDS OPERATING ALTERNATELY IN ACTIVE AND STAND-BY MODES

FIELD OF THE INVENTION

The present invention relates to a network adaptor for use in interfacing a data processing system with a data communications network; and, more particularly, to a network adaptor wherein the interface board and control board thereof are duplicated.

DESCRIPTION OF THE PRIOR ART

A data communications network may interconnect a plurality of dispersed data processing systems for data exchange among themselves, wherein the data processing system is an electronic apparatus that can store, rearrange and retrieve data, and also can control and communicate with another apparatus. For example, a centralized tariff management system employed in a PSTN(public switched telecommunications network) typically comprises a host data processing system and a plurality of dispersed peripheral data processing systems as a terminal equipment. A data communications network connecting these data processing systems as a linking equipment.

The so-called Ethernet, a well-known LAN(Local Area Network) protocol, or a packet communications network covered by the ITU-T Rec. X.25(hereinafter referred to as "X.25 packet network") is frequently adopted as the linking equipment for the exchange of data between the host data processing system and each of the peripheral data processing systems.

A properly designed network adaptor is required for the interfacing between the data processing system and the data communications network. As shown in FIG. 1, a network adaptor 110 linking the data processing system 100 with data networks 120 helps for the data processing system to exchange data, via the networks, with remote data processing systems connected to the other side of the data networks 120. The data networks 120 may include an X.25 packet network 121 and an Ethernet 122.

FIG. 2 is a schematic diagram of a conventional network adaptor 110. Communications between the data processing system 100 and a control unit 210, and among an interface unit 220, the Ethernet 122 and the packet network 121 are performed in a serial pattern by using the well-known RS232C or RS422 protocol. In contrast, communications between the control unit 210 and the interface unit 220 are performed in a parallel pattern by using the well-known VME bus. Therefore, the control unit 210 and the interfacing unit 220 convert serial data into parallel data, and vice versa. The control board 210 generates various control signals to control the interface unit 220. The interface unit 220 performs basic protocol functions of the Ethernet 122 and the X.25 packet network 121. The interface unit 220 has two communications ports for the Ethernet 122 and the packet network 121, respectively, for exchanging data with these networks.

In the conventional network adaptor, however, once an interface is established, it is rather difficult to enlarge the interface capacity. If the data processing system 100 requires more communications ports in addition to the two established communications ports, the data processing system 100 itself must be capable of performing multiple serial communications, requiring a modification of the data processing system 100. Besides, if any part within the conventional network adaptor 110 is out of order, the whole function of the network adaptor 200 could be paralyzed.

SUMMARY OF THE INVENTION

It is, therefore, a primary object of the present invention to provide a network adaptor which is capable of increasing the access capacity in a data communications network with an improved reliability.

In accordance with the present invention, there is provided an apparatus for interfacing a data processing system with N number of data communications networks, wherein the data processing system can store, rearrange and retrieve data, and also can control and communicate with another data processing system, each data communications network is for use in distributing and exchanging data between data processing systems, and N is positive integer, which comprises: M number of interfacing means, each for coordinating data exchange between the data processing system and the N number of data communications networks, wherein the M number of interfacing means are identical to each other and operate alternately in active/stand-by mode so that one in the M number of interfacing means is in active mode while the others are in stand-by mode and M is a positive integer more than one; and linking means for exchanging data between the M number of interfacing means.

BRIEF DESCRIPTION OF THE DRAWINGS

The above and other objects and features of the present invention will become apparent from the following description of preferred embodiments given with reference to the accompanying drawings, in which:

FIG. 5 shows the details of the Ethernet controller shown in FIG. 4.

DETAILED DESCRIPTION OF THE PREFERRED EMBODIMENTS

Figure 1:
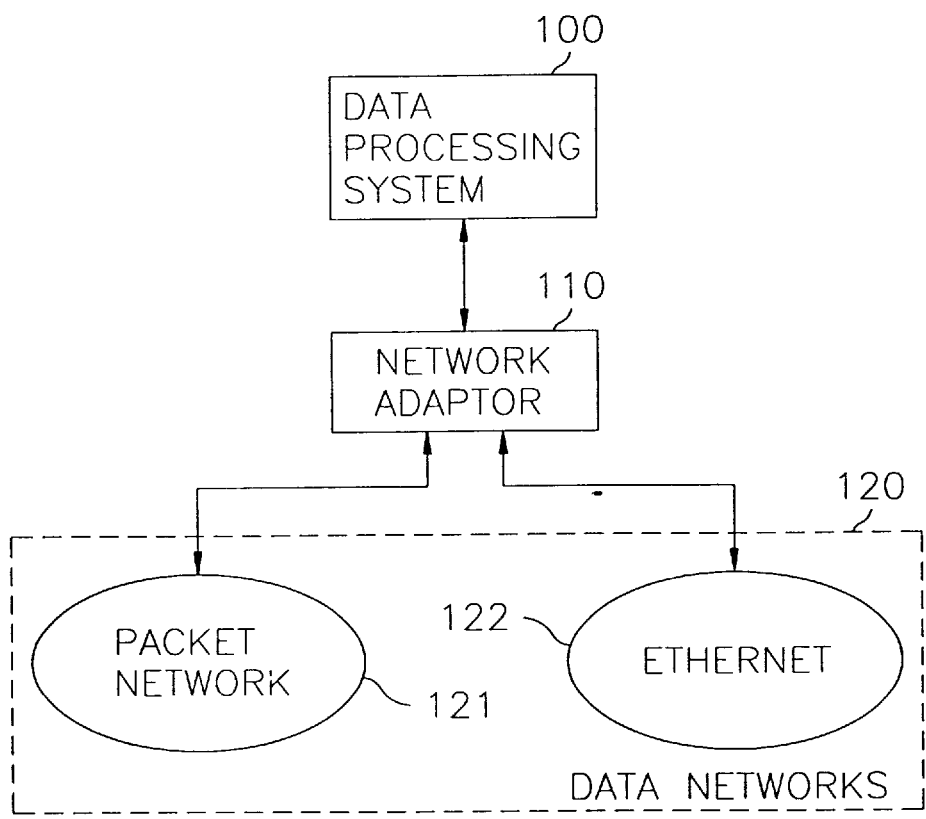
FIG. 1 is a schematic diagram that shows a connection of a data processing system to data networks.
Figure 2:
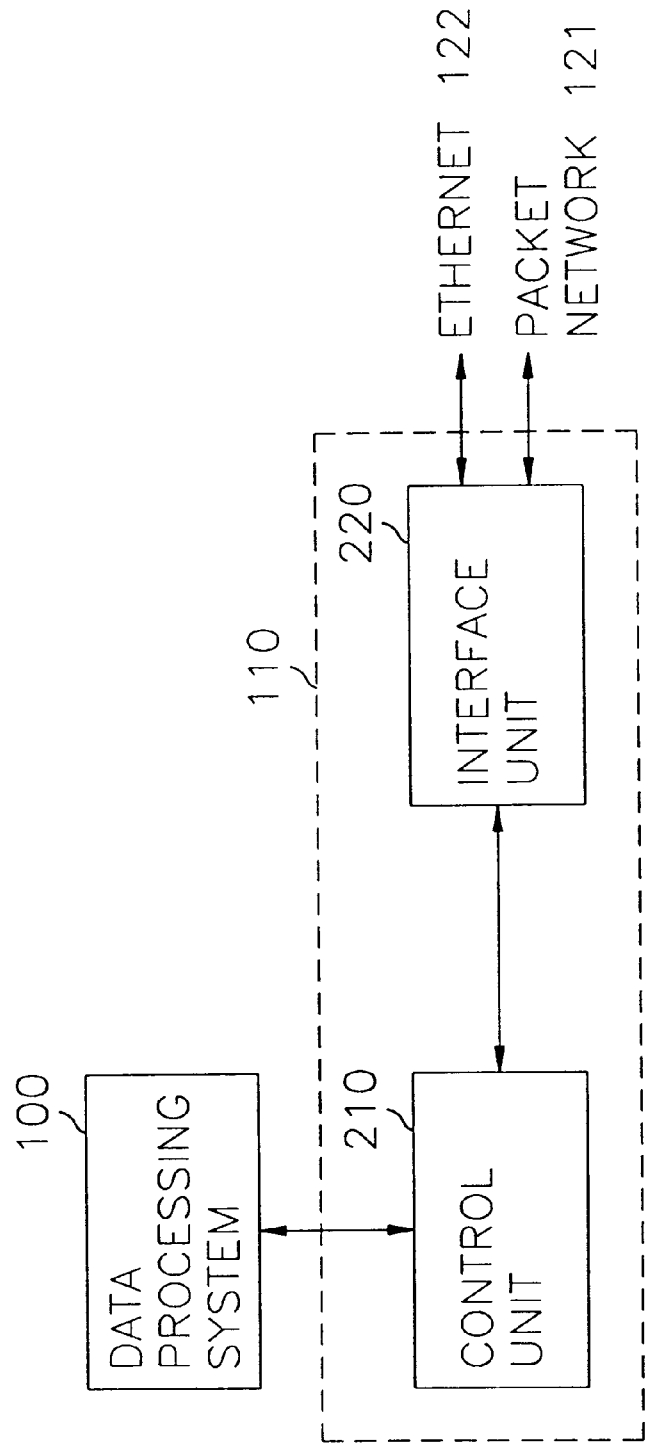
FIG. 2 presents a conventional network adaptor.
Figure 3:
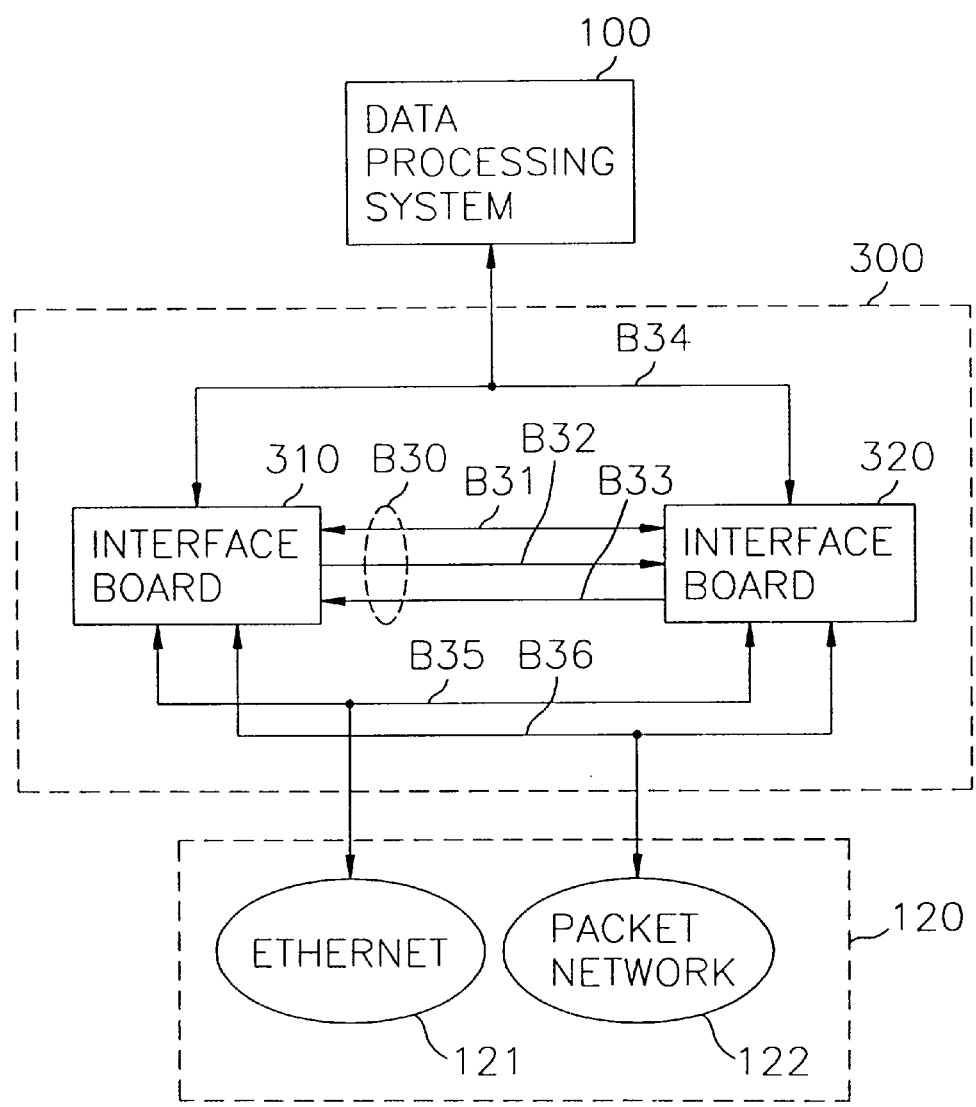
FIG. 3 illustrates a network adaptor in accordance with the present invention.

A network adaptor 300 in accordance with the preferred embodiment of the present invention is shown in FIG. 3, which interfaces a data processing system 100 and data networks 120. Like numerals in FIGS. 1 to 4 refer to like elements.

The network adaptor 300 includes two identical interface boards 310 and 320 and communications buses interconnecting the interface boards 310 and 320, the data processing system 100 and the data networks 120.

Each of the interface boards 310 and 320 has an integrated function of a control unit 210 and an interface unit 220(both not shown) same as the ones shown in the prior art FIG. 2.

The description of the operation of the pairs of interface boards 310 and 320 in active/stand-by mode will now be given hereinafter.

The two interface boards 310 and 320 are identical to each other in terms of structure, function and operation but operate alternately in active/stand-by mode. The two interface boards 310 and 320 operate in so-called hot stand-by mode; that is, same data is always commonly shared by the two control boards even when only one of the two interface boards operates in active mode at a time while the other interface board is in stand-by mode. For sharing common data between the dual interface boards, a bus B31 through which one interface board in active mode sends data to the other interface board in stand-by mode is used. Buses B32 and B33 are used in informing the status of each board to the other.

In case one of the two interface boards, for example, the interface board 310, becomes out of order while it is in active mode, the other interface board 320 in stand-by mode is designed to automatically enter into active mode and replace the malfunctioning interface board 310 without interrupting the operation in progress; the malfunctioning interface board 310 automatically turns into stand-by mode and beeps to alert an operator.

Figure 4:
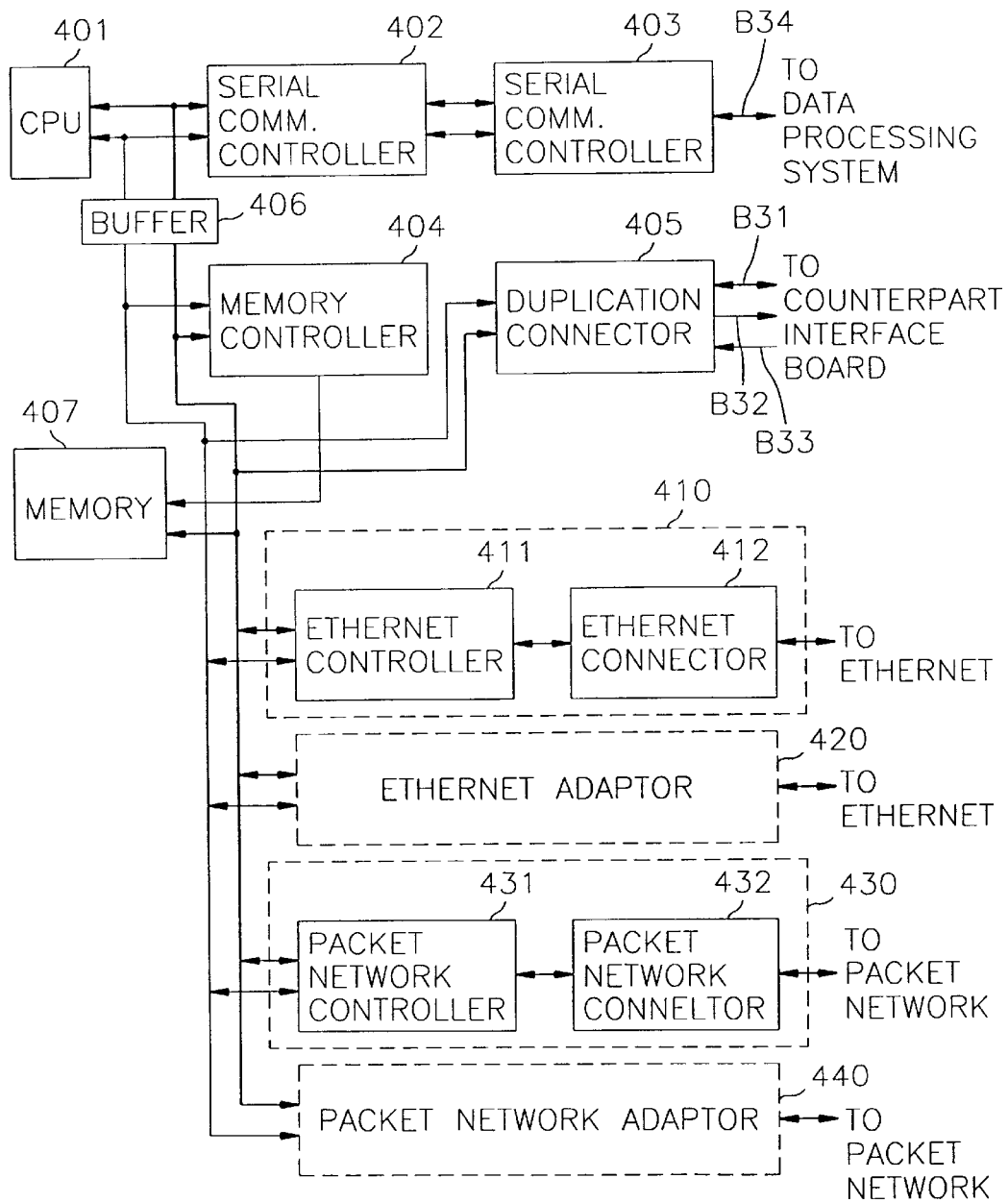
FIG. 4 describes the details of the interface board shown in FIG. 3.

FIG. 4 illustrates a detailed structure of the interface board 310 shown in FIG. 3. The interface board 310 includes a CPU(Central Processing Unit) 401, a serial communications controller 402, a serial communications connector 403, a memory controller 404, a duplication connector 405, a buffer 406, a memory 407, two Ethernet adaptors 410 and 420 and two packet network adaptors 430 and 440.

The CPU 401 is directly connected to the serial communications controller 402, the memory controller 404, the duplication connector 405, the buffer 406, the memory 407, the two Ethernet adaptors 410 and 420 and the two packet network adaptors 430 and 440 through an address-and-data bus which is shown with thick lines in FIG. 4, and is also directly connected to the serial communications controller 402, the memory controller 404, the duplication connector 405, the memory 407, the two Ethernet adaptors 410 and 420 and the two packet network adaptors 430 and 440 through a control bus which is depicted with thin lines in FIG. 4.

The CPU 401 generates various control signals to control the operation of those parts connected thereto through the control bus and exchange information with those parts connected thereto through the address-and-data bus.

The buffer 406 includes two buffering units(not shown): one is a unidirectional for an address bus, and the other is a bi-directional for a data bus. The buffer increases output current drive capacity of the address and the data buses to adequately control the bus lines.

The serial communications controller 402 controls the operation of the serial communications connector 403 and exchanges data with the data processing system. The serial communications controller 402 is embodied by using a customized integrated communications controller.

The memory 407 is for storing data exchanged between each interface boards and the data communications networks; and between each interface boards and the data processing system.

The memory controller 404 controls buses connected to the CPU 400 so that the CPU 401 can communicate with only one device connected thereto at a time.

The duplication connector 405 is for transferring address, data, status information, i.e., information on the status of each interface board and control signal to update the counterpart interface board 320 with data identical to that of the interface board 310. A parallel, bidirectional bus B31 is for interchanging the address and data and serial, unidirectional buses B32 and B33 are for interchanging status information and control signals for serial communications. The address and data exchanged through the bus B31 is transferred to and from the memory 407 and the control signals and the status information on the buses B32 and B33 are transferred to and from the serial communications controller 402.

An Ethernet connector 412 is for establishing connection, transferring data and terminating connection. The Ethenet connector 412 also converts serial data coming from the Ethernet into parallel one, and converts parallel data going out to the Ethernet into serial one. The Ethernet connector 412 operates under the control of the Ethernet controller 411.

An Ethernet controller 411 includes, as shown in FIG. 5, a control logic 510, a local address buffer 520, a local data buffer 530, an address latch 540, a data converter 550, an Ethernet RAM 560 and an Ethernet control chip 570. Herein, the local address buffer 520 stores address received from the CPU 401 and passes the address received from the CPU 401 to the Ethernet RAM 560, the local data buffer 530 stores data received from the CPU 401 and passes the data received from the CPU 401 to the Ethernet RAM 560 and the data converter 550 and stores data received from the Ethernet RAM 560 and passes the data received from the Ethernet RAM 560 to the CPU 401. The direction of the transfer of the local data buffer 530 is decided by the control logic 510.

The Ethernet control chip 570 executes the Ethernet protocol under the control of the CPU 401.

The data converter 550 converts 32-bit data processed at the CPU 401 into 16-bit data to be processed at the Ethernet control chip 570, and vice versa. That is, the data from the CPU 401 to the Ethernet control chip 570 is converted from 32-bit into 16-bit, and the data from the Ethernet control chip 570 to the CPU 401 is converted from 16-bit into 32-bit.

The address latch 540 latches address of the Ethernet control chip 570 by using a latch control signal received from the control logic 510 and sends the address to the Ethernet RAM 560.

The control logic 510, under the control of the CPU 401, sends an address buffer control signal for use in buffering addresses to the local address buffer 520; sends a data buffer control signal for use in buffering data and deciding a data flow direction to the local data buffer 530; transfers the control signal for use in the CPU to control the Ethernet control chip 570 to the Ethernet control chip 570; outputs the latch control signal for use in latching address of the Ethernet control chip 570 to the address latch 540 when the Ethernet control chip 570 outputs address to read from or write to the Ethernet RAM 560; and generates a converter control signal for use in controlling the operation of the data converter 550.

Hereafter, the operation of the Ethernet controller 411 will be described.

For the Ethernet controller 411 to send data to the Ethernet, the CPU 401 transfers the data to be transmitted from the memory 407 to a transmission area of the Ethernet RAM 560. That is, the CPU 401 outputs a specific address and data and sends an Ethernet RAM write control signal. The specific address passes through the buffer 406 and the local address buffer 520 and arrives at the Ethernet RAM 560. On the other hand, the specific data passes through the buffer 406 and the local data buffer 530 and arrives at the Ethernet RAM 560. The control logic 510 decodes the Ethernet RAM write control signal and sends an Ethernet RAM write signal to the Ethernet RAM 560. Consequently, upon the CPU's instruction, the Ethernet control chip 570 fetches the specific data stored in the transmission area of the Ethernet RAM 560, after the conversion at the data converter 550, to send the fetched specific data to the Ethernet through the Ethernet connector 412.

On the other hand, when the Ethernet control chip 570 receives data from the Ethernet, the Ethernet control chip 570 stores the received data in a receiving area of the Ethernet RAM 560 preset by the CPU 401, wherein the received data is converted at the data converter 550 before being stored in the Ethernet RAM 560. The Ethernet control chip 570 sends an interrupt signal to the CPU 401 by way of the control logic 510, and then, the CPU 401 fetches the data stored in the receiving area of the Ethernet RAM 560 by way of the local data buffer 530 and stores the data in the memory 407. Herein, when the Ethernet control chip 570 reads from or write to the Ethernet RAM 560, the Ethernet control chip 570 outputs the address to be available on the Ethernet control chip output line and informs the address latch 540 of the availability of the address. The address latch 540 latches the address and transfers the address to the Ethernet RAM 560.

A single address-and-data bus is used for exchanging both the address and the data. Part of address-and-data bus is commonly used in exchanging both the address and the data; and the rest of the address-and-data bus is used for exchanging only the address. For example, considering only address and data, and if the data is 16-bit and the address is 32-bit, the data takes up only the line of 0 to 15 of the address-and-data bus while the address takes up the line of 0 to 31 of the address-and-data bus. Therefore, when the data is stored in or fetched from the Ethernet RAM 560, the address is processed first and then data is processed.

When the CPU 401 transmits an Ethernet control chip control signal to the Ethernet control chip 570, the Ethernet control chip control signal is transmitted by way of the local data buffer 530 and the data converter 550, in contrast to the data which is transmitted by way of the Ethernet RAM 560.

The structure, function and operation of the packet network adaptor 430 are almost identical to those of the Ethernet adaptor 410 as described above, except for the Ethernet control chip 570, the Ethernet RAM 560 and the Ethernet connector 432. There are included a packet network control chip(not shown), a packet network RAM(not shown) and a packet network connector(not shown) in the packet network adaptor 430, in place of the Ethernet control chip 570, the Ethernet RAM 560 and the Ethernet connector 432. The packet network control chip and the packet network connector perform the protocol pertaining to the X.25 packet network, but other than that, they operate in the same manner as the Ethernet control chip 570. The structure, function and operation of the packet network RAM is same as the Ethernet RAM 560; only the name is different.

In accordance with the preferred embodiment of the present invention, the Ethernet adaptor pair and the packet network pair are fabricated on a single card. And on the network adaptor 300, slots to accommodate the cards are provided for the card to be easily replaced.

The operations of the pair of the Ethernet adaptors 410 and 420 and the pair of the packet network adaptors 430 and 440 in active/stand-by mode are basically same, and the description will be given for the Ethernet adaptors.

The two Ethernet adaptors 410 and 420 are identical to each other in terms of structure, function and operation and operate in so-called hot stand-by; that is, same data is always commonly shared by the two control boards even when only one of the two Ethernet adaptors operates in active mode at a time while the other Ethernet adaptor is in stand-by mode. For sharing common data between the dual Ethernet adaptors 410 and 420, use is made of buses connecting one to the other through which one Ethernet adaptor in active mode sends data to the other Ethernet adaptor in stand-by mode.

In case one of the two Ethernet adaptors, for example, the Ethernet adaptor 410, becomes out of order while it is in active mode, the other Ethernet adaptor 420 in stand-by mode is designed to automatically enter into active mode and replace the malfunctioning Ethernet adaptor 410 without interrupting the operation in progress; the malfunctioning Ethernet adaptor 410 automatically turns into stand-by mode and beeps to alert an operator.

From the description above, it is apparent that the network adaptor in accordance with the present invention is more reliable; for, the interface board pair 300 is duplicated to operate in active/stand-by mode; and the Ethernet adaptors 410 and 420 and packet network adaptors 430 and 440 are also duplicated to operate in active/stand-by mode. Each of the duplicated pairs is devised to automatically switch over to the other when a trouble occurs in one of the duplicated pairs.

In addition, the network adaptor in accordance with the present invention is more flexible; more Ethernet adaptors and more packet network adaptors can be added on by simply inserting additional adaptors without having to replace the whole network adaptor.

While the present invention has been described with respect to the preferred embodiments, other modifications and variations may be made without departing from the scope and spirit of the present invention as set forth in the following claims.

What is claimed is:

1. An apparatus for interfacing a data processing system with an N number of data communications networks, wherein the data processing system serves to control and communicate with another data processing system, each data communications network is for use in distributing and exchanging data between data processing systems, and N is a positive integer, the apparatus comprising:

an N number of interfacing means, each for coordinating a data exchange between the data processing system and the N number of data communications networks, wherein each interfacing means is identical to each other and operates alternately in an active and a stand-by modes so that one in the M number of interfacing means is in the active mode while the others are in the stand-by mode, M being a positive integer larger than one, wherein each of the interfacing means includes:

a serial communications controller for generating a serial communications connector control signal and performing operation to exchange data between said each of the interfacing means and the data processing system;

a memory controller for controlling buses connected to a CPU (Central Processing Unit) so that the CPU communicates with only one device connected thereto at a time;

a memory for storing data exchanged between said each of the interfacing means and the data communications network(s), and between said each of the interfacing means and the data processing system, under the control of the memory controller;

a duplication connector for transferring data and status information to update each of the interfacing means in the stand-by mode with data identical to that of the interfacing means in the active mode;

a serial communications connector for establishing connection, transferring data and terminating connection, and for converting serial data provided thereto into parallel data, and vice versa;

an N number of network adapters for receiving, storing, processing and sending data when the data processing system interchanges the data with the data communications network(s) through said each of the interfacing means and for establishing connection, transferring data and terminating connection, and for converting serial data coming from the data communications network into parallel data, and vice versa; and the CPU for controlling the operation of the serial communications controller, the memory controller, the memory and the network adopters; and linking means for exchanging data among the M number of interfacing means.

2. The apparatus recited in claim 1, wherein said M is two.

3. The apparatus recited in claim 1, wherein the data communications network is an Ethernet.

4. The apparatus recited in claim 1, wherein the data communications network is an X.25 packet data network.

5. The apparatus recited in claim 1, wherein the data communications network employs both an Ethernet and an X.25 packet data network.

6. The apparatus of claim 1, further comprising a buffer for increasing output current drive capacity of both an address bus and a data bus connected to the CPU.

7. The apparatus of claim 6, wherein N number of network adapters operate in active/stand-by mode.

8. The apparatus of claim 7, wherein each of the network adapters includes:

a network connector for establishing connection, transferring data and terminating connection, and converting serial data coming from each of the data communications networks into parallel data, and parallel data going out to the data communications networks into serial data; and a network controller for controlling the operation of the network connector.

9. The apparatus of claim 8, wherein the network connector comprises:

a network RAM (read access memory) for storing address and data received originally from the CPU and data to be transferred to the CPU;

a local address buffer for storing and passing the address received from the CPU to the network RAM;

a local data buffer for storing and passing the data received from the CPU to the network RAM and the data converter and storing and passing the data received from the network RAM to the CPU;

a network control chip for executing the network protocol under the control of the CPU;

a data converter for converting 32-bit data processed at the CPU into 16-bit data to be processed at the network control chip, and vice versa;

an address latch for latching an address of the network control chip by using a latch control signal received from the control logic and sending the address of the network control chip to the network RAM; and a control logic for controlling the operation of the network connector.

10. The apparatus of claim 9, wherein the control logic sends an address buffer control signal for use in buffering addresses to the local address buffer, sends a data buffer control signal for use in buffering data and deciding a data flow direction to the local data buffer, transfers the control signal for use in the CPU to control the network control chip to the network control chip, outputs the latch control signal for use in latching address of the network control chip to the address latch when the network control chip outputs address to read from or write to the network RAM, and generates a converter control signal for use in controlling the operation of the data converter.

11. The apparatus of claim 10, wherein the data processed at the CPU is of 32-bit.

12. The apparatus of claim 11, wherein the data processed in the network control chip is of 16-bit.

13. An apparatus for interfacing a data processing system with an N number of data communication network(s), wherein N is a positive integer, comprising:

an N number of interface boards, each configured to coordinate data exchange between the data processing system and the data communication network(s), wherein only one of the interface boards is in an active mode any one time while the others are in a stand-by mode, wherein each interface board includes:

a plurality of network adapters configured to:
receive, store, process and send data,
establish and terminate connections, and
convert serial data coming from the data communication network(s) into parallel data, and vice versa; and linking means for exchanging data between the interface boards.

14. The apparatus of claim 13 wherein each interface board further includes:

a duplication connector for transferring data and status information to update each of the interface boards in the stand-by mode with data identical to that of the interface board in the active mode.

15. The apparatus of claim 14 wherein each interface board further includes:

a serial communications controller for generating a serial communications connector control signal and performing operation to exchange data between each interface board and the data processing system;

a memory controller for controlling buses connected to a CPU (Central Processing Unit) so that the CPU communicates with only one device connected the CPU at a time;

a memory for storing data exchanged between said each of the interface boards and the data communications network(s), and between said each of the interface boards and the data processing system, under the control of the memory controller; and a serial communications connector for establishing connection, transferring data and terminating connection, and for converting serial data provided thereto into parallel data, and vice versa.

16. The apparatus of claim 15, wherein each of the network adapters includes:

a network connector for establishing connection, transferring data and terminating connection, and converting serial data coming from each of the data communications networks into parallel one, and parallel data going out to the data communications networks into serial one; and a network controller for controlling the operation of the network connector.

* * * * *